Aug. 25, 1970          L. SCHWEIKL          3,525,475
EXHAUST GAS DEFLECTING PIPE

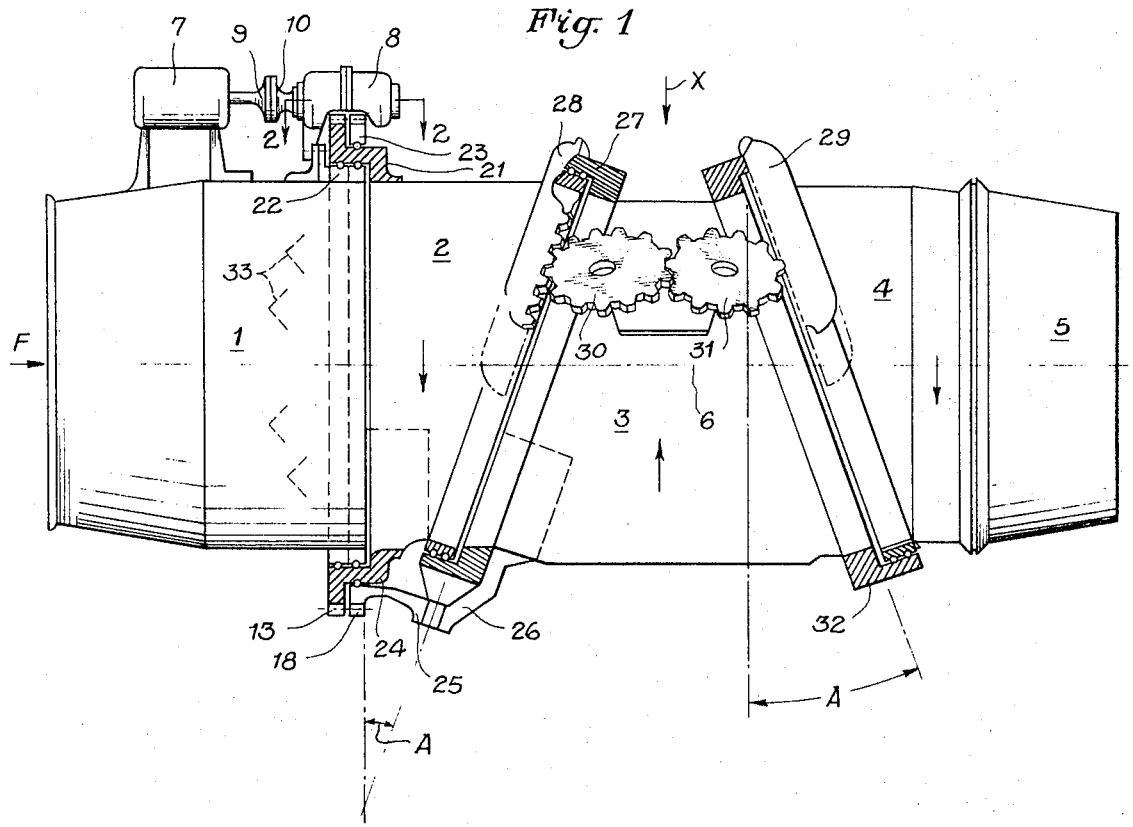
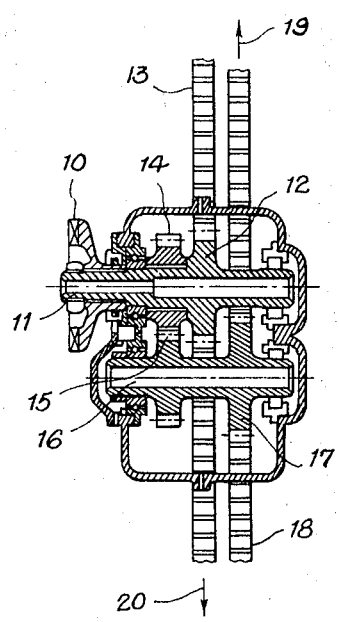
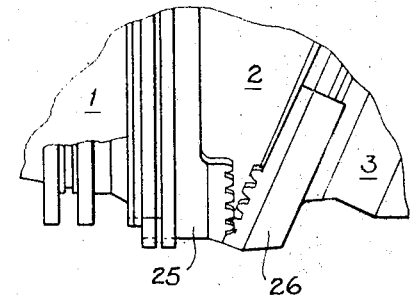

Filed Nov. 6, 1968                    2 Sheets-Sheet 2

INVENTOR
Ludwig Schweikl

United States Patent Office 3,525,475
Patented Aug. 25, 1970

---

3,525,475
EXHAUST GAS DEFLECTING PIPE
Ludwig Schweikl, Moosburg, Germany, assignor to Motoren- und Turbinen-Union, Munich, Germany
Filed Nov. 6, 1968, Ser. No. 773,761
Claims priority, application Austria, Nov. 9, 1967, A 10,082/67
Int. Cl. B64c *15/04;* F02k *1/24;* F16h *1/20*
U.S. Cl. 239—265.35                                6 Claims

ABSTRACT OF THE DISCLOSURE

The exhaust gas deflecting device for a gas turbine is composed of a stationary pipe section to which are joined three rotatable pipe sections connected together by a train of segmental spur gears so that the first pipe section directly drives the third or end pipe section in the same direction of rotation of the first pipe section, while the second or middle pipe section is driven in opposite direction of rotation to said first and third pipe sections.

---

This invention relates to a gas deflector composed of a stationary pipe section, followed by two or more pipe sections which are rotatable, relative to each other, about their longitudinal axes, in order to deflect gases, in particular, the hot exhaust gases of a turbo jet engine, within a vertical plane passing through the centerline of the gas deflecting device, said gases being deflected from a horizontal into a vertical direction of flow, whereby the opposing circular faces of the pipe sections, which are ro-rotatable relative to each other, are inclined with respect to the longitudinal centerlines of the latter and a drive motor is arranged on the stationary pipe section.

A gas deflector featuring several pipe sections, which can be rotated relative to each other, has been disclosed in Swiss Pat. No. 327,871. Said patent also contains a description of a device for actuating the gas deflector disclosed therein.

The gas deflecting device disclosed in Swiss Pat. No. 327,871 has the disadvantage of being unable to deflect an exhaust gas jet leaving an engine, which is in parallel position with respect to the longitudinal centerline of the aircraft, parallel to the vertical longitudinal centerline plane of the engine from a horizontal into a vertical direction of flow, since the individual pipe sections, which are arranged in tandem and can be rotated relative to each other, are bent. Thus the whole gas deflector has a snake-like shape which applies both to its stretched position and, for example, to a position in which the deflector is bent downwards with respect to the longitudinal centerline of the engine, this system causing considerable flow losses in the engine gases being exhausted. Finally, this gas deflector configuration is not suited for reheating the engine gases within the gas deflector, since a satisfactory additional combustion of the engine gases is ensured only if the gas deflector configuration is free of obstructions detrimental to the flow. This, however, cannot be accomplished with a device according to Swiss Pat. No. 327,781 due to the bends and edges protruding into the gas stream as a consequence of the elbow-type design of the individual pipe sections. Furthermore, there is the risk that, with this device, the bent sheet metal components of the pipe sections protruding, for example, into a high-temperature (2000° C.) gas stream, will burn through or will even be over-heated to such extent as to cause jamming of the swivelling bearings of the individual pipe sections due to overheating, thus causing them also to fail.

As a further disadvantage of said deflecting device, it should be noted that, due to its above-mentioned snake-like shape, it will require considerably more space in circumferential direction which, however, is extremely limited, for example, in the fuselage aft section due to the desirable slenderness of an aircraft, so that a contemplated side-by-side arrangement of two engines in the fuselage aft section with the addition of gas deflectors according to Swiss Pat. No. 327,871 to these engines would be hardly feasible. In this case, the considerable amount of circumferential space required by the individual pipe sections is also necessitated by the brackets and supporting devices of the individual pipe elbows arranged on the sides of the exhaust gas deflector, this rangement being required for the very complicated actuating mechanism used for producing the swivelling motion of the individual pipe sections, as described below.

With the gas deflector according to Swiss Pat. No. 327,871, the first rotatable elbow drives the second following elbow via a gear rim arranged at its outlet end, the drive of the remaining elbows being effected in a similar manner. The multitude of transmission gearwheels and gear rims required will, of course, lead to an increase in the total backlash of the device which will endanger positive positioning of the individual elbows.

The objects of this invention are to avoid the disadvantages of the above-mentioned known gas deflector and to produce a gas deflecting device which will ensure a satisfactory deflection, compatible with flow requirements, especially of hot gases, from a horizontal into a vertical direction of flow or into any desired intermediate position between horizontal and vertical direction of flow. Also, to produce a space saving, reliable drive mechanism.

In general, these objects are obtained in the following manner. In a device as mentioned in the beginning, a gear system positively coupled to an actuator is used to drive two gear rim segments simulatneously in opposite directions of rotation, the first of said gear rim segments being connected to the first rotatable or turntable pipe section and a first bearing outer race which rides on a bearing inner race encircling the outlet end of the stationary pipe section, whereby the other gear rim segment is connected to a second bearing outer race supported by the surface of the first bearing outer race, which has been designed to form the bearing inner race, the second bearing outer race being provided with an additional, preferably, bevel gear-type rim segment. This gear rim segment is in engagement with a suitably designed gear rim segment, which is mounted on the second rotatable pipe section and encircles the gearing between the first and second rotatable pipe section over a distance corresponding to its length. Thus, the rotary motion of the second gear rim segment, as actuated via the gear system and opposite to the first rotatable pipe section, is transmitted to the second rotatable pipe section.

Due to the use of the bevel-type gear rim segments, which are in direct engagement with each other, for driving the second rotatable pipe section, the back lash is considerably reduced. In addition, this type of transmission ensures a stable and reliable drive of the second rotatable pipe section, since, at all times, several teeth of the bevel gear-type rim segments are in engagement, and since that bevel gear-type rim which causes the rotary movement of the second pipe section is supported on the stationary pipe section.

In a further embodiment of this invention and for driving a third rotatable pipe section following the second rotatable pipe section by means of the first rotatable pipe section, opposing, preferably bevel gear-type, rim segments are arranged around the circumference of the outlet end of the first rotatable pipe section and around the circumference of the inlet end of the third rotatable pipe section, and that both gear rim segments are engaged with each other via two meshed gearwheels located on the circumference of the second rotatable pipe section.

This ensures that the first and third rotatable pipe sections are, at all times, jointly driven in the same direction of rotation and at the same circumferential speed. Moreover, no additional brackets or supporting features on the outside of the gas deflector will be required for driving the first, second and third pipe sections.

According to another embodiment of this invention, the points of engagement of the bevel gear-type rim segments are arranged in the region of the shortest sideflank on the circumference of the first rotatable pipe section between the two adjacent swivelling bearings.

In this manner, the two bevel gear-type rim segments driving the second rotatable pipe section can be brought into direct engagement without the use of any additional idling gears.

According to a further feature of this invention, that part of the second rotatable pipe section which in plan view appears as the taper end half of a wedge and is, actually, a segment of the pipe circumference starting at the centerline and extending to the point of the narrowest sideflank on the pipe circumference between the two adjacent swivelling bearings, is, during swivelling of the gas deflector, rotated past the bevel gear-type rim segments connected to the two outer pipe sections, whereby the gearwheels associated with the bevel gear-type rim segments are positioned in front of the point of the narrowest sideflank of the pipe circumference of the second rotatable pipe section.

In a further embodiment of this invention, the gear rim segments extend over 90 to 120°, and the bevel gear-type rim segments over 180 to 240°, of the circumference of the jet pipe sections associated with the gas deflector.

In order to prevent mutual contact between the bevel gear-type rim segments which drive the second rotatable pipe section and the bevel gear-type rim segment connected to the circumference of the outlet end of the first rotatable pipe section during swivelling of the gas deflector, a further feature of this invention is in that, during swivelling of the gas deflector, the bevel gear-type rim segments encircle the bevel gear-type rim segment connected to the outlet end of the first rotatable pipe section without contacting same.

The means by which the objects of this invention are obtained are described more fully with reference to the accompanying schematic drawings in which:

FIG. 1 is a top view of the gas deflector including its associated drive system, shown in one of its end positions;

FIG. 2 is a cross-sectional view taken on the line 2—2 in FIG. 1 showing a gear system associated with the gas deflector;

FIG. 3 is a detail plan view of the transmission elements used for swivelling of the gas deflector according to FIG. 1 as seen from the top;

Figure 4:
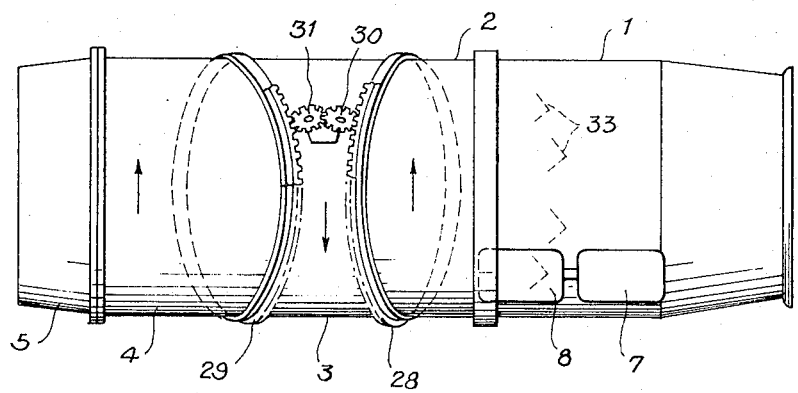
FIG. 4 is a side view of the gas deflector including part of the associated drive system, as seen in the direction of arrow X on FIG. 1.

The gas deflector, as shown in FIG. 1, is composed of a stationary pipe section 1 and of three rotatable or turnable pipe sections 2, 3 and 4. At the end of the last pipe section, a variable thrust nozzle 5 is provided. The inlet and outlet ends of the rotatable pipe section 3 are inclined with respect to its longitudinal centerline 6. The outlet end of pipe section 2 as well as the inlet end of pipe section 4 are each parallel to the respective ends of the intermediate rotatable pipe section. The angles marked A in FIG. 1 may amount to approximately 22.5° each. The angle A designates the inclination between the inlet and outlet ends, respectively, of the intermediate rotatable pipe section 3 and the straight outlet end of stationary pipe section 1.

Figure 5:
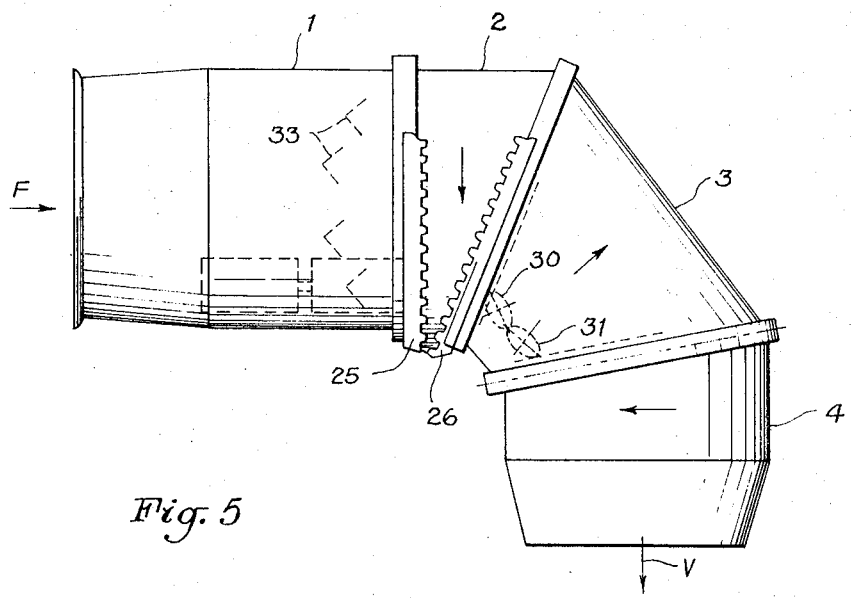
FIG. 5 is a side view of the gas deflector in its second end position, including part of its associated drive system.

In order to turn the gas deflector from its straight end position, as shown in FIG. 1, into the end position according to FIG. 5, i.e. to be able to eject a gas jet, which has entered the gas deflector from a turbojet engine, not shown herein, in the direction of arrow F, for generating a vertical thrust in the direction of arrow V, FIG. 5, in this case, i.e. with a gas deflector consisting of three rotatable pipe sections, pipe sections 2 and 4 are jointly rotated at the same circumferential speed in the direction of the arrows shown, while, simultaneously, the intermediate rotatable pipe section 3 is rotated relative to the two outer pipe sections and, according to the arrow shown, in opposite direction to these. In order to ensure that, in spite of the fact that the pipe ends are inclined according to angle A, the faces of the oblique pipe ends rotating relative to each other will still remain circular when being swivelled into the end position according to FIG. 5, all rotatable pipe sections 2, 3 and 4 have slightly elliptical cross-sectional areas.

Swivelling of the individual pipe sections 2, 3 and 4 is effected by means of an actuator such as a drive motor 7 mounted laterally at the circumference of stationary pipe section 1, e.g. an air motor, positively coupled to a transmisson 8 which is also mounted on pipe section 1. An enlarged sectional view of transmission 8 is shown in FIG. 2. Actuator 7 transmits its rotational movement via gear coupling 9, 10 to gearshaft 11, the associated gearwheel 12 of which is engaged with a first gear rim segment 13 connected to pipe section 2.

A gearwheel 14, also located on gearshaft 11, is simultaneously engaged with a smaller gearwheel 15 which is driven in a direction of rotation opposite to that of gearshaft 11. The gear ratio between gearwheels 14 and 15 is approximately 1:1.1 which causes gearshaft 16, associated with gearwheel 15, to rotate in an opposite direction to gearshaft 11 and at a circumferential speed which is slightly higher than that of gearwheel 15. A further gearwheel 17 arranged on shaft 16 transmits the rotation of shaft 16 to a second gear rim segment 18 which is thus driven in the direction of arrow 19 and opposite to direction of rotation 20 of gear rim segment 13.

Gear rim segment 13 connected to the first rotatable pipe section 2 is connected to a bearing outer race 21 which rides on an associated bearing inner race 22 secured at the circumference of the outlet end of stationary pipe section 1.

Gear rim segment 18, being driven in an opposite direction to gear rim segment 13 by means of transmission 8, is also connected to a bearing outer race 23, the associated bearing inner race 24 is formed by the surface of bearing outer race 21.

A bevel gear-type rim segment 25 is connected to bearing outer race 23, this gear rim segment 25 being in engagement with a suitably designed gear rim segment 26 which is mounted on the circumference of the inlet end of pipe section 3.

In accordance with direction of rotation 19 of gear rim segment 18, FIG. 2, pipe section 3 is thus rotated in opposite direction to pipe section 2. The outlet end face of pipe section 2 and the corresponding inlet end face of pipe section 3 are connected to one another with the aid of a ball bearing 27 surrounding the two end faces of pipe sections 2, 3. Approximately opposite to the two bevel gear-type rim segments 25, 26 on the circumference of bearing 27, another bevel gear-type rim segment 28 is arranged on the outlet end of pipe section 2. Opposite to same, note FIGS. 1 and 4, a corresponding gear rim segment 29 is located on the circumference of the inlet end of pipe section 4, both gear rim segments 28, 29 being engaged via two meshing gear wheels 30, 31 mounted on the circumference of the second rotatable pipe section 3. Due to this arrangement of gearwheels 30, 31 and of the bevel gear-type rim segments 28, 29, the two pipe sections 2, 4 are rotated simultaneously and at the same circumferential speed in the direction of the arrows shown on pipe sections 2, 4. Another swivelling bearing 32, corresponding to swivelling bearing 27, connects the outlet end of pipe section 3 with the inlet end of pipe section 4.

The two gear rim segments 28, 29 encircle about 180° of the circumferences of their asociated pipe sections 2 and 4. A clearer picture of the arrangement of the bevel gear-type rim segments 28, 29 as well as of their associated gearwheels 30, 31 is shown in FIG. 4 which is a view in the direction of arrow X in FIG. 1.

It should be noted that, upon swivelling of the jet deflector from the straight position in FIG. 1 into the deflected position in FIG. 5 the bevel gear-type rim segment 28 and the bevel gear-type rim segments 25, 26, approach each other according to the opposite direction of rotation of pipe sections 2 and 3 so that, with increasingly deflected position of the gas deflector, the bevel gear-type rim segments 25, 26 are sliding over the bevel gear-type rim segment 28 without contacting same.

The end position of the gas deflector in FIG. 5 is, at the same time, the end position of the bevel gear-type rims 25, 26 as well as the end position of gearwheels 30, 31 arranged on the circumference of the second rotatable pipe section 3, these gear wheels having been positioned as shown in FIG. 5 after pipe section 3 has been rotated over approximately 180° from the position shown in FIG. 4. An afterburner for further combustion of the supplied gases inside the gas deflector can be provided in stationary pipe section 1. The fuel nozzles 33 required for this purpose are shown in FIGS. 1, 4 and 5.

Having now described the means by which the objects of this invention are obtained, I claim:

1. An exhaust gas deflecting device comprising a stationary pipe section, at least two turnable pipe sections joined to each other and to said stationary pipe section and rotatable about their longitudinal axes for deflecting hot engine exhaust gases from a direction parallel to the longitudinal engine axis to a direction normal to the engine axis for producing a vertical thrust, each turnable pipe section having at least one end inclined with respect to the pipe section longitudinal axis, and drive motor means (7) mounted on said stationary pipe section for turning said turnable pipe sections, transmission means (8) connected to said motor means, a first segmental spur gear (13) joined to a first turnable pipe section (2), a second segmental spur gear (18) joined to said transmission means said first and second spur gears (13, 18) being driven simultaneously in opposite directions by said transmission means, a first outer bearing ring (21) joined to said first segmental spur gear (13) and a first inner bearing ring (22) surrounding the discharge end of said stationary pipe section (1) and upon which said first outer bearing ring (21) rolls, a second outer bearing ring (23) supported on the surface of said first outer bearing ring (21) connected to said second segmental spur gear (18) and forming a second inner bearing ring surface (24), a beveled segmental spur gear (25) on said second outer bearing ring (23), a corresponding segmental spur gear (26) attached to said second turnable pipe section (3) and engaging said beveled spur gear (25), a bearing (27) between said first and second pipe sections and partially surrounded by the length of said corresponding spur gear (26) for transmitting the rotational movement of said second segmental gear (18) to said second turnable pipe section (3).

2. A device as in claim 1, further comprising a third turnable pipe section (4), a pair of beveled segmental spur gears (28, 29) one of which (28) being joined to the gas outlet end of said first turnable pipe section (2) and the other (29) being joined to the gas inlet end of said third pipe section (4), and gearwheel means (30, 31) meshed with and between said pair of spur gears (28, 29) for transmitting the rotational movement of said first turnable pipe section (2) directly to said third pipe section (4).

3. A device as in claim 2, said beveled spur gear (25) and said corresponding spur gear (26) being engaged where the inclined edge of said first pipe section (2) is nearest the gas outlet end of said stationary pipe section (1) and lying between said first outer bearing ring (21) and said bearing (27).

4. A device as in claim 3, said gearwheel means (30, 31) being mounted on said second pipe section (3) adjacent the position where the inclined edge of said first pipe section (2) is remote from the gas outlet end of said stationary pipe section (1).

5. A device as in claim 4, said spur gears (13, 18) encircling the outlet end of said pipe section (1), said bevelled spur gears (25, 26) encircling the outlet end of said pipe section (2) and the inlet end of said pipe section (3), said bevelled spur gear (28) encircling the outlet end of said pipe section (2) and said bevelled spur gears (25) encircling the inlet end of said pipe section (4), said spur gears (13, 18, 25 and 26) extending over an arc of 90° to 120° and said bevelled spur gears (28, 29) over an arc of 180° to 240°.

6. A device as in claim 5, said spur gears (25, 26) being out of engagement with said spur gear (28) while said pipe sections are rotated.

References Cited

UNITED STATES PATENTS

| | | | |
|---|---|---|---|
| 3,429,509 | 2/1969 | Markowsk | 239—265.35 X |
| 3,441,220 | 4/1969 | Wildner | 239—265.35 |
| 3,443,758 | 5/1969 | Kopp et al. | 239—265.35 |
| 3,450,348 | 6/1969 | Kopp | 239—265.11 |
| 3,459,460 | 8/1969 | Kopp | 239—265.35 X |

LEONARD H. GERIN, Primary Examiner

U.S. Cl. X.R.

60—232; 74—421